United States Patent
Needham et al.

[11] Patent Number: 5,888,612
[45] Date of Patent: Mar. 30, 1999

[54] LOAD-BEARING STRUCTURES

[75] Inventors: Donald G. Needham, Ramona; William Kinzie, Cleveland; James H. Harris, Bartlesville, all of Okla.

[73] Assignee: Poly Plus Inc., Bartlesville, Okla.

[21] Appl. No.: 540,811

[22] Filed: Oct. 11, 1995

Related U.S. Application Data

[63] Continuation-in-part of Ser. No. 475,319, Jun. 5, 1995, Pat. No. 5,607,531.

[51] Int. Cl.$^6$ ...................................................... B32B 3/12
[52] U.S. Cl. ......................... 428/116; 52/793.1; 428/117; 428/118
[58] Field of Search ................................... 428/116, 117, 428/118; 52/793.1

[56] References Cited

U.S. PATENT DOCUMENTS

| | | | |
|---|---|---|---|
| D. 355,064 | 1/1995 | Kinzie et al. | D34/38 |
| 379,027 | 3/1888 | Pickering | 52/600 X |
| 726,506 | 4/1903 | Capen | 52/591.4 |
| 2,336,235 | 12/1943 | Fischer | 428/189 X |
| 2,481,046 | 9/1949 | Scurlock | 428/116 X |
| 3,617,416 | 11/1971 | Kromrey | 156/197 X |
| 3,998,023 | 12/1976 | Anderson | 428/117 X |
| 4,154,634 | 5/1979 | Shobert et al. | 156/180 |
| 4,462,712 | 7/1984 | Penland, Sr. | 52/581 X |
| 4,629,358 | 12/1986 | Springston et al. | 428/193 X |
| 4,752,513 | 6/1988 | Rau et al. | 428/91 |
| 4,879,956 | 11/1989 | Shuert | 108/53.3 |
| 4,954,382 | 9/1990 | Riefler et al. | 428/116 |
| 5,139,596 | 8/1992 | Fell | 428/116 X |
| 5,180,619 | 1/1993 | Landi et al. | 428/116 |
| 5,190,809 | 3/1993 | Marissen et al. | 428/225 |
| 5,234,204 | 8/1993 | Hunt | 269/41 |
| 5,405,567 | 4/1995 | Needham et al. | 264/322 |
| 5,496,610 | 3/1996 | Landi et al. | 428/116 X |
| 5,527,585 | 6/1996 | Needham et al. | 428/903.3 X |
| 5,607,531 | 3/1997 | Needham et al. | 156/166 |

FOREIGN PATENT DOCUMENTS 8131250  7/1981  Japan .

*Primary Examiner*—Henry F. Epstein
*Attorney, Agent, or Firm*—Timothy R. Kroboth

[57] ABSTRACT

In one aspect, the present invention provides a load-bearing structure with a novel interlocking edge. Also provided is a method of making a load-bearing structure having an overlapping edge, in which structural members are combined so that a stepped-down lip of one structural member covers a peripheral edge of another member. Also provided is a load-bearing structure having cellular structure and which is useful with or without an overlapping edge. In addition, there is provided a molding method for making cellular, load-bearing structures.

17 Claims, 5 Drawing Sheets

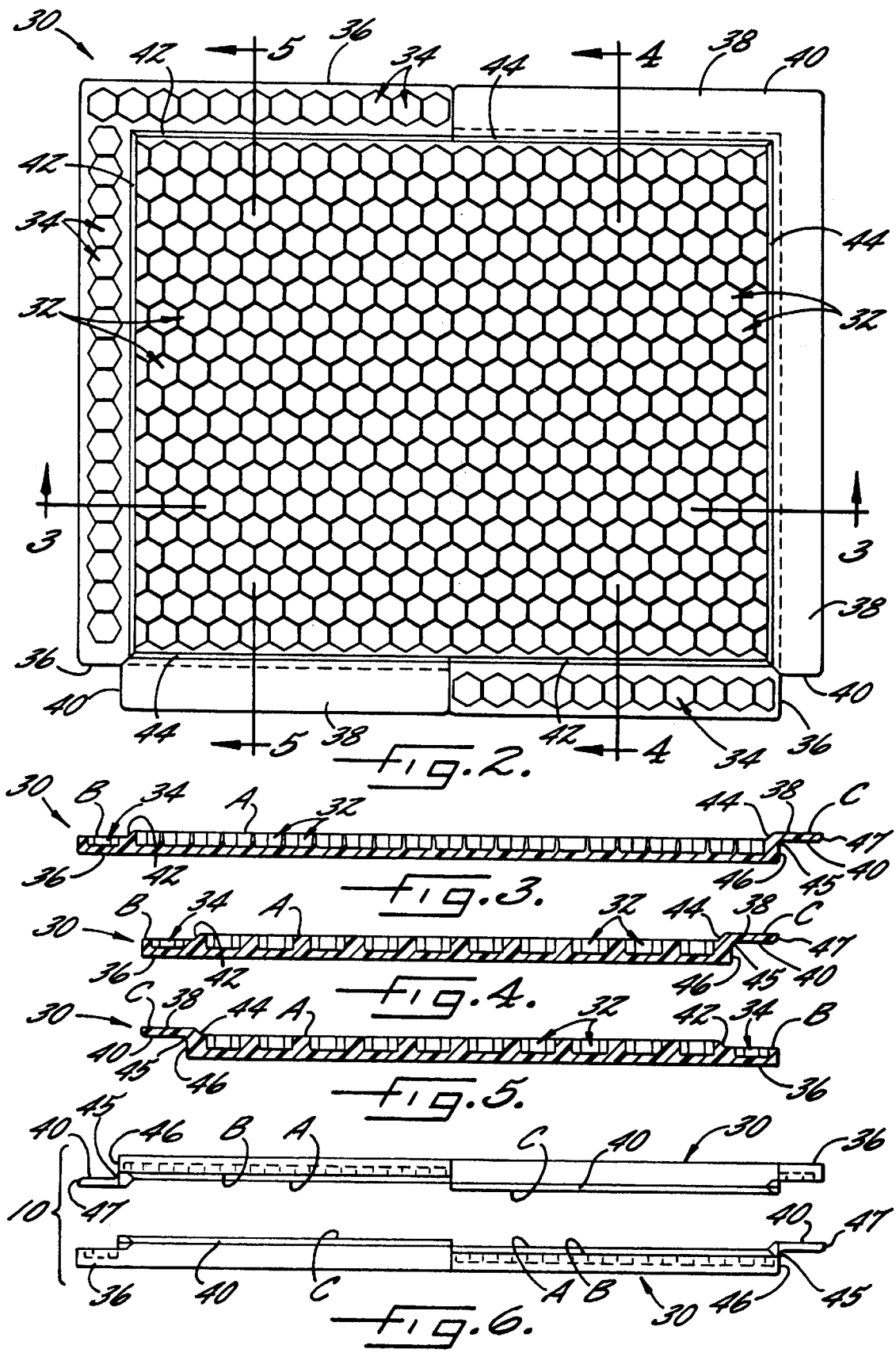

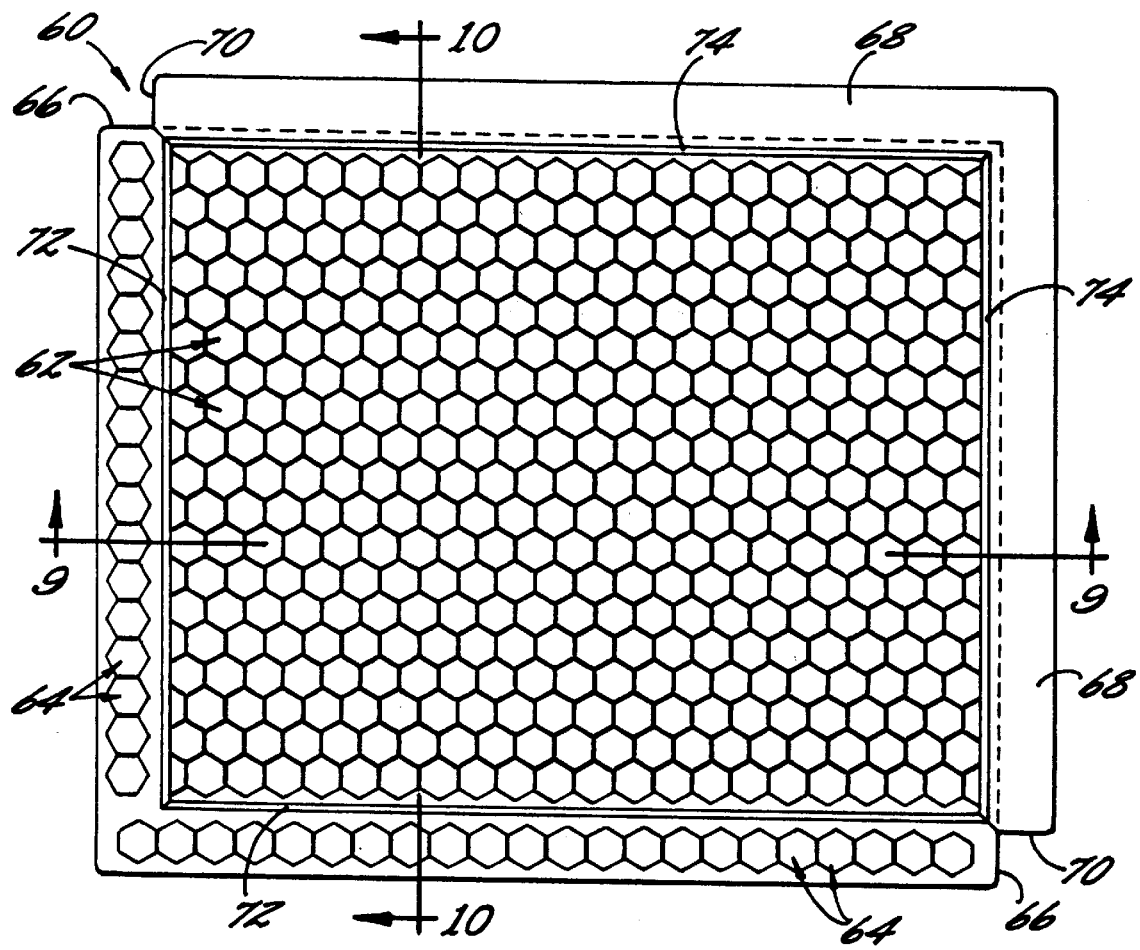
Fig. 8.
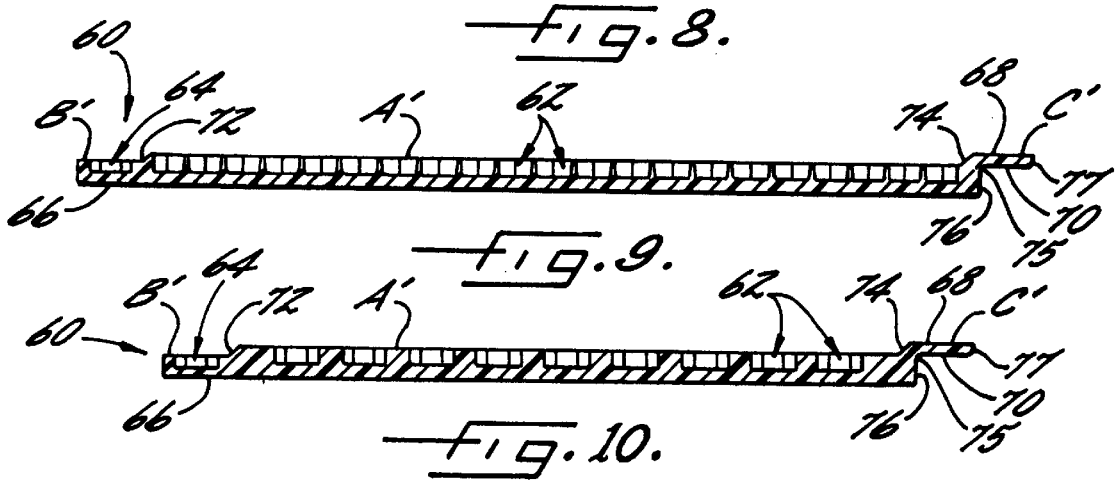
Fig. 9.
Fig. 10.

LOAD-BEARING STRUCTURES

This application is a continuation-in-part of U.S. patent application Ser. No. 08/475,319, filed on Jun. 5, 1995, now U.S. Pat. No. 5,607,531, which issued on Mar. 4, 1997.

TECHNICAL FIELD

This invention relates to load-bearing structures, to the use of reinforcing fiber/polymer composites in load-bearing structures, and to load-bearing structures for making a load-bearing surface.

BACKGROUND ART

Load-bearing structures with overlapping edges which are fitted together or otherwise combined to make a load-bearing surface, are well known. Illustrative are hard wood flooring pieces provided with tongue and groove interfit. Nevertheless, there is a need for a load-bearing structure having an improved interlocking edge, and in particular with reduced weight but yet good load-bearing properties.

Thermoplastic polymer/reinforcing fiber composites are used to replace metals in aerospace and automotive applications. However, new applications have been slow due to the higher cost of composites when compared to conventional materials like metal, wood or concrete. If the cost could be adequately reduced and yet the strength could be maintained, numerous applications exist where thermoplastic polymer/reinforcing fiber composites could replace metal, wood or concrete. These applications include furniture framing, power poles, shipping containers, crates, shipping pallets, platforms, construction decking, bridge decking, mud pads, road mats, driveways, warehouse flooring, and flooring for trucks and trailers.

Known uses of thermoplastic polymer/reinforcing fiber composites further include reinforcing bars or re-bars, reinforced mats and reinforced fabrics. These uses are illustrated in U.S. Pat. No. 4,154,634 to Shobert et al, U.S. Pat. No. 4,752,513 to Rau et al, and U.S. Pat. No. 5,190,809 to Marissen et al. Advantageously, the thermoplastic polymer strengthens and stiffens the composite. This type of polymer is often termed a "matrix resin" in the context of polymer/reinforcing fiber composites.

Engineering type, plastic resins such as polyester, nylon, polyphenylene sulfide and polyurethane are frequently used as matrix resins in fiberglass composite laminates and pultrusion profiles. When solid, these resins are very rigid and provide the most stiffness, but fracture when overstressed, often leaving sharp splintered edges.

Accordingly, there is a need for load-bearing structures of reduced cost and yet good load-bearing properties. In addition, if fiber/matrix resin composites are used in certain load-bearing structures, there is a need for flexibility of the composites so that fracturing and sharp splintered edges do not result.

SUMMARY OF THE INVENTION

In accordance with the present invention, an improved load-bearing structure with an overlapping edge to be fitted together with like parts to make a load-bearing surface, is provided. Beneficially, the structure includes an edge which interlocks with an edge of a like part to prevent slippage or movement in a direction parallel to the interlocking edges. This load-bearing structure is advantageously provided with cellular structure for weight and cost reduction. Preferably, for strength, the cellular structure is a honeycomb structure.

In accordance with the invention, a method of manufacturing a load-bearing structure having an overlapping edge, includes making and assembling a pair of structural members each including interiorly located structure defining a first plane, a peripheral edge having a surface defining a second plane which extends from the first plane, and a stepped-down lip having a surface defining a third plane which extends from the first plane, wherein the second and third planes are oppositely offset from the first plane. By "interiorly located" is meant located interior to a peripheral edge or stepped-down lip, that is, not in a peripheral edge or stepped down lip. In accordance with the method, these structural members are combined so that a stepped-down lip of each structural member covers a peripheral edge of the other structural member.

Beneficially, the assembled structural members are visually identical members. However, the method is also applicable to structural members that are not visually identical. Advantageously, the structural members may be molded.

A key aspect is the use of a stepped-down lip from one member to cover a peripheral edge of the other member. As a result, an edge is made that is given strength by both structural members. Advantageously, the stepped-down lip may also cover exposed cell structure in a peripheral edge. Further edge strengthening may be achieved using a stepped-down lip having a solid cross-section, that is, no cellular structure.

Also in accordance with the present invention, is a molded, load-bearing structure having cellular structure and yet good load-bearing properties, and which is useful apart from or in combination with an overlapping edge such as the previously described, interlocking edge. In the latter case, a solid cross-section, stepped-down lip beneficially includes reinforcing fiber/matrix resin composite. This assists the lower half of an overlap which must carry the full load along the edge as the load moves from one section of a load-bearing surface to the next.

In one aspect, this load-bearing structure beneficially includes skin structure adjacent to and covering cellular structure, and in particular cellular structure sandwiched between skin structures. Reinforcing fiber/matrix resin composite may be advantageously located in the skin structure, as well as in the cellular structure.

In accordance with the present invention, reinforcing fiber/matrix resin composite is thermally bonded to adjacent thermoplastic structure. In this regard, it has been found that the compression strength, stiffness and stress rupture of large relatively flat plastic articles are benefitted by molding reinforcing fiber/matrix resin composites into an article during manufacture, and using a matrix resin compatible with the molding resin so as to result in thermally bonding or fusing together into a solid mass.

Advantageously, when the fiber/matrix resin composite is located in the cellular structure, the composite is disposed within walls forming the cellular structure. When the fiber/matrix resin composite is located exterior to the cellular structure, it has been discovered that a layered skin structure including fibrous reinforcing structure in the form of fibrous web structure provides advantageous load-bearing properties.

In certain applications, a cellular thermoplastic, load-bearing structure may be at risk of floating away, if flooded. To avoid this, walls forming the cellular structure may include bleeder holes connecting the cells, and the cells may be filled with a fluid. Water may be used as the fluid provided that the structure has a specific gravity greater than one. If water or a like aqueous fluid is used to fill the cells, a gelling agent may be used in an effective amount.

In another aspect, the cellular, load-bearing structure includes a plurality of reinforcing fiber/matrix resin composite structures, disposed within walls forming the cellular structure. In an embodiment of this structure, cells are open to the ambient environment, that is, not sandwiched between and covered by skin structures. Beneficially, composite structure is thermally bonded to adjacent thermoplastic structure.

In applications where some flexibility is desired and fracturing and sharp edges are not acceptable, polyolefins such as polyethylene and polypropylene, may be advantageously used as the matrix resin of fiber/matrix resin composite.

Also provided is a method of molding. By the method, there are placed into a lower mold member in sequence, a first thermoplastic polymer, reinforcing fiber/matrix resin composite, and a second thermoplastic polymer, the matrix resin being compatible with the first and second thermoplastic polymers. In addition, a plurality of fibrous reinforcing members are vertically disposed within wall-forming portions of an upper mold member. Then, the lower and upper mold members are combined under suitable molding conditions, and after cooling, there is demolded a composite structure comprising a layer of the first thermoplastic polymer fusion bonded to the reinforcing fiber/matrix resin composite fusion bonded to a layer integral with cell-forming walls and formed of the second thermoplastic polymer, the fibrous reinforcing members being molded into the cell-forming walls. Advantageously, the fibrous reinforcing members are fusion bonded to the adjacent wall structure.

In the drawing and in the detailed description of the invention that follows, there are shown and essentially described only preferred embodiments of this invention, simply by way of illustration of the best mode contemplated of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWINGS

Reference is now made to the accompanying drawing, which forms a part of the specification of the present invention, and which depicts preferred embodiments in accordance with the present invention.

FIG. 2 is a plan view of a structural member of the load-bearing structure of FIG. 1;

FIG. 3 is a cross-sectional view taken substantially along line 3—3 of FIG. 2;

FIG. 4 is a cross-sectional view taken substantially along line 4—4 of FIG. 2;

FIG. 5 is a cross-sectional view taken substantially along line 5—5 of FIG. 2;

FIG. 6 is an assembly view showing relative orientation of structural members for making the load-bearing structure of FIG. 1;

FIG. 8 is a plan view of a structural member for making a second embodiment of a preferred loading-bearing structure in accordance with the present invention;

FIG. 9 is a cross-sectional view taken substantially along line 9—9 of FIG. 8;

FIG. 10 is a cross-sectional view taken substantially along line 10—10 of FIG. 8;

DETAILED DESCRIPTION

As mentioned, in one aspect, the present invention relates to improved load-bearing structures with overlapping edges to be fitted together to make a load-bearing surface such as flooring, driveways and decking, or a temporary surface. Referring to FIGS. 1 to 6, a preferred load-bearing structure 10 in accordance with the present invention, is provided.

Figure 1:
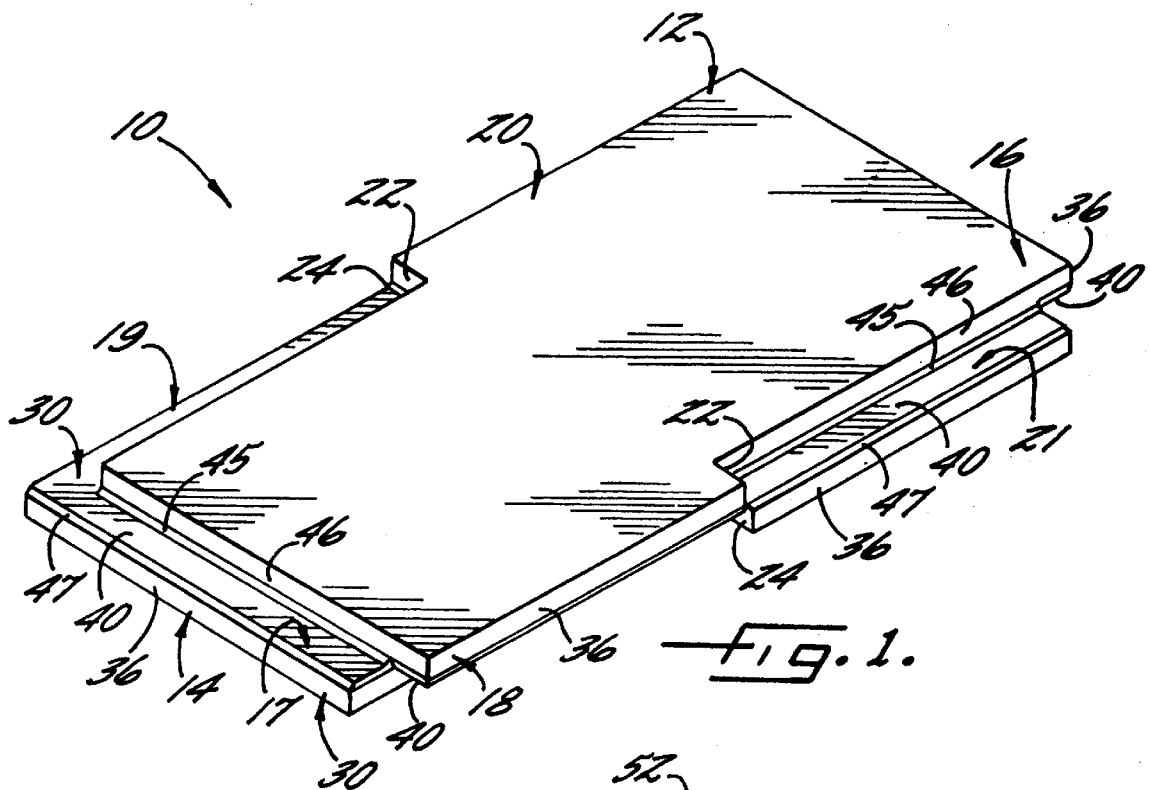
FIG. 1 is a perspective view of a preferred load-bearing structure in accordance with the present invention.

With particular reference to FIG. 1, load-bearing structure 10 includes an upper stratum 12 which overhangs a lower stratum 14. More particularly, generally rectangular structure 10 includes opposing upper and lower offsets 16,17 located along the width, and opposing upper and lower offsets 18,19 and opposing upper and lower offsets 20,21 located along the length.

An important feature is that upper and lower offsets are disposed in a side-by-side relationship. Thus, upper offset 18 and lower offset 21 of one length are located side-by-side, as well as upper offset 20 and lower offset 19 of the other length. Accordingly, structure 10 includes split overlaps along the length, but a single overlap along each width. As a result of the split overlaps, an adjacent, like configured, structural member situated to mate with offsets 18,21 or offsets 19,20, interlocks with structure 10. Beneficially, the interlocking prevents slippage or movement of the interlocked structures in the lengthwise direction. More particularly, ends 22,24 of offsets of different strata, cooperate to oppose movement in the lengthwise direction.

As will be understood, the width could be configured with side-by-side upper and lower offsets. Also, it is not necessary that the structure be rectangular or be limited to four sides. For example, the structure could be square or could have six or more sides such as a hexagon or an octagon.

Load-bearing structure 10 may be formed of a variety of well known materials including wood, plastic and rubber. However, a limitation is that the material be suitable for a load-bearing surface.

With particular reference to FIGS. 2 to 6, structure 10 beneficially is provided with cellular structure for weight and cost reduction, including cellular structure in the offsets. Advantageously, the cellular structure is a honeycomb structure.

In accordance with the present invention, structure 10 is advantageously assembled from molded structural members. Referring particularly to FIGS. 3 to 6, a molded structural member 30 includes interiorly located, exposed cell structure 32 defining a first plane A; exposed cell structure 34 in a peripheral edge 36 having a surface defining a second plane B which extends from plane A; and a stepped-down lip 40 having a surface 38 which defines a third plane C, which also extends from plane A. As indicated, planes B and C are beneficially oppositely offset from plane A by a substantially equal distance. The stepped-down lip is beneficially solid in cross-section, that is, does not have cellular structure.

As further shown, advantageously planes A,B are connected by chamfered transition surfaces 42, and planes A,C are connected by chamfered transition surfaces 44; in other words, the transition surfaces are not at right angle to, but rather are disposed oblique to, the connected planes. A radius 45 connects stepped-down lip 40 and a side wall 46 of the member, and an end 47 of the stepped-down lip is likewise defined by a radius.

With reference to FIG. 6, in accordance with the present invention, structure 10 may be advantageously assembled from two visually identical, structural members. As a result, only a single mold is necessary to make both structural members, and this provides cost savings. FIG. 6 depicts the relative orientation of structural members 30,30 for assembly, with one member rotated 180 degrees relative to the other member. As shown, structural members 30,30 are combined so that stepped-down lips 40 of each structural member cover cellular peripheral edges 36 of the other structural member.

Referring again to FIG. 1, it may be seen that an offset is vertically formed by a stepped-down lip 40 and a peripheral edge 36. More particularly, for both split overlaps, a pair of stepped-down lips cover and reinforce a pair of cellular peripheral edges. Note particularly that offsets 16,17,18,20 and 21 are so depicted in FIG. 1. As a result, an offset or edge is strengthened by both structural members.

Figure 7:
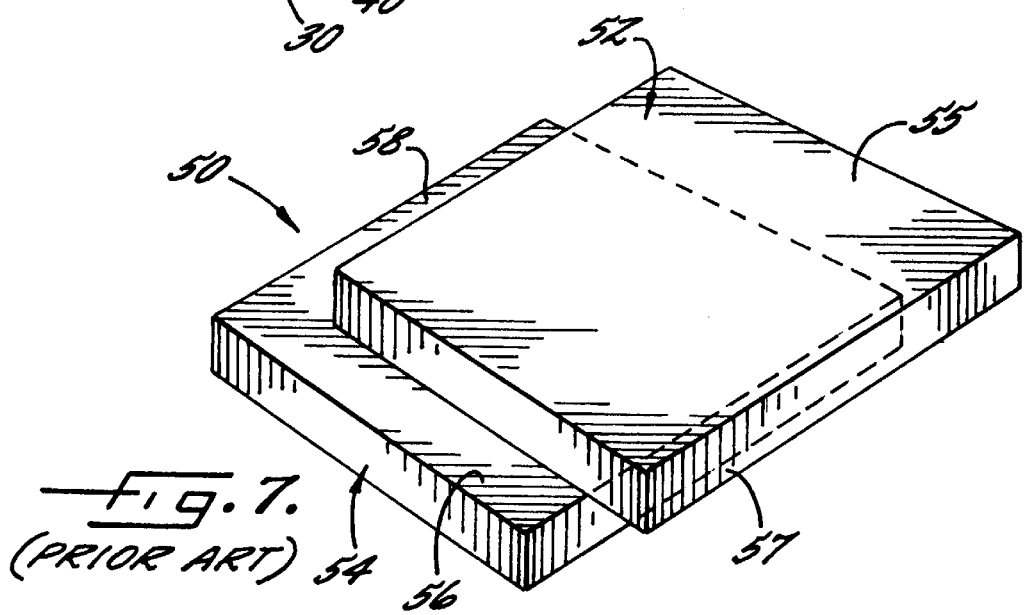
FIG. 7 is a perspective view of a prior art load-bearing structure.

Referring to FIG. 7, a prior art load-bearing structure 50 to be combined with like parts for making a load-bearing surface, is shown. Structure 50 is formed by offsetting solid layers so that an upper layer 52 overhangs a lower layer 54 on two of its sides. As a result, the structure includes opposing upper and lower offsets 55,56 and opposing upper and lower offsets 57,58, which provide an edge for overlapping with like structures in making a load-bearing surface.

Figure 11:
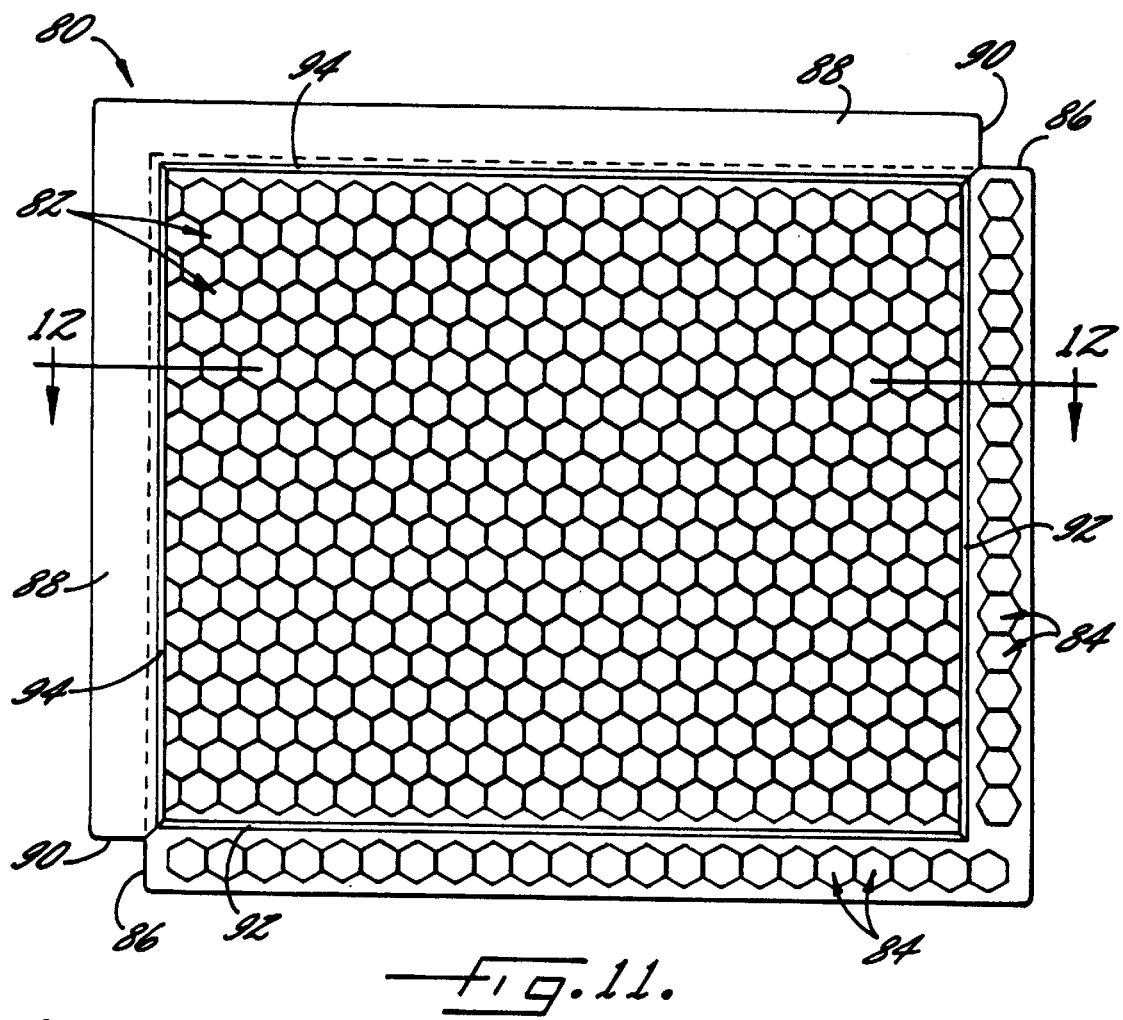
FIG. 11 is a plan view of a structural member which is the mirror image of the structural member of FIG. 8.
Figure 12:
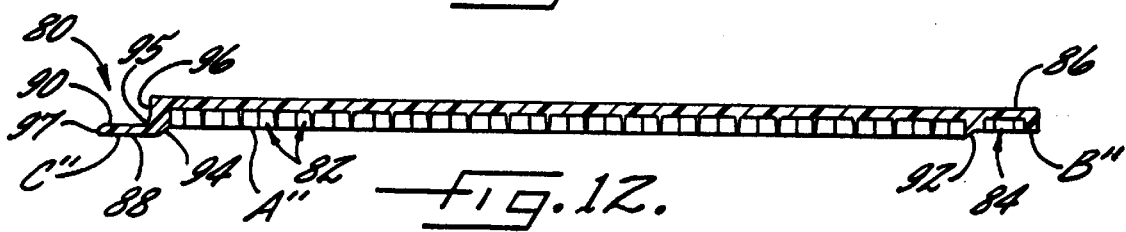
FIG. 12 is a cross-sectional view taken substantially along line 12—12 of FIG. 11.

In accordance with the present invention and with reference to FIGS. 8 to 13, structure 50 beneficially is modified to have a cellular structure, including cellular structure in the offsets, and a modified structure 100 is advantageously assembled from molded structural members as described. FIGS. 8 to 10 show one structural member 60, and FIGS. 11 and 12 show a mirror image, structural member 80.

Referring to FIGS. 8 to 10, and in particular to FIGS. 9 and 10, a molded structural member 60 includes interiorly located, exposed cell structure 62 defining a first plane A'; exposed cell structure 64 in a peripheral edge 66 having a surface defining a second plane B' which extends from plane A'; and a stepped-down lip 70 having a surface 68 which defines a third plane C', which also extends from plane A'. As indicated, planes B' and C' are beneficially oppositely offset from plane A' by a substantially equal distance.

As further shown, advantageously planes A',B' are connected by chamfered transition surfaces 72, and planes A',C' are connected by chamfered transition surfaces 74. Thus, transition surfaces 72,74 are disposed oblique to the connected planes. A radius 75 connects stepped-down lip 70 and a side wall 76 of the member, and an end 77 of the stepped-down lip is likewise defined by a radius.

Referring to FIGS. 11 and 12, and in particular to FIG. 12, mirror image, structural member 80 includes interiorly located, exposed cell structure 82 defining a first plane A"; exposed cell structure 84 in a peripheral edge 86 having a surface defining a second plane B" which extends from plane A"; and a stepped-down lip 90 having a surface 88 defining a third plane C", which also extends from plane A". Planes B" and C" are beneficially oppositely offset from plane A" by a substantially equal distance.

As further shown, advantageously planes A", B" are connected by chamfered transition surfaces 92, and planes A", C" are connected by chambered transition surfaces 94. Thus, the transition surfaces are disposed oblique to the connected planes. A radius 95 connects stepped-down lip 90 and a side wall 96 of the member, and an end 97 of the stepped-down lip is likewise defined by a radius.

Figure 13:
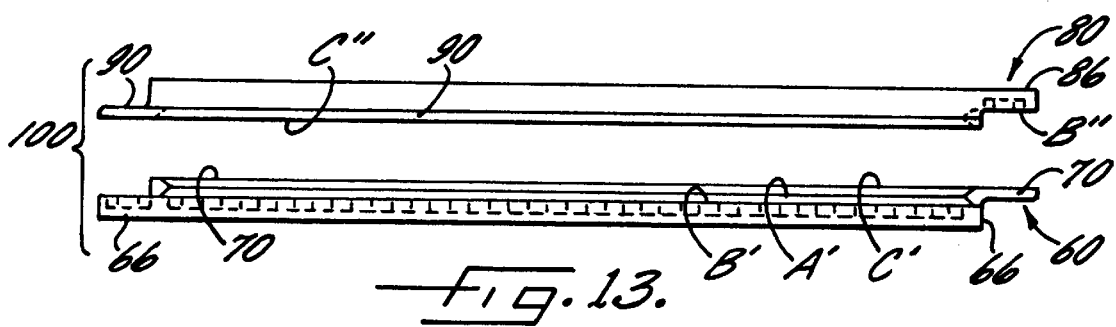
FIG. 13 is an assembly view showing relative orientation of the structural members of FIGS. 8 and 11, for making the second embodiment of a load-bearing structure in accordance with the present invention.

With reference to FIG. 13, in accordance with the present invention, structure 100 may be assembled from structural members 60,80. FIG. 13 depicts the relative orientation of these structural members for assembly. As shown, structural members 60,80 are similarly combined as in FIG. 6 so that stepped-down lips of each structural member cover peripheral edges of the other structural member. In this case, a stepped-down lip covers and reinforces a cellular peripheral edge on all four sides.

As stated, a key aspect is the use of a stepped-down lip from one member to cover a peripheral edge of the other member. As a result, an offset or edge is strengthened by both structural members. This advantage broadly applies to overlapping edges in which load-bearing properties are of importance.

Figure 14:
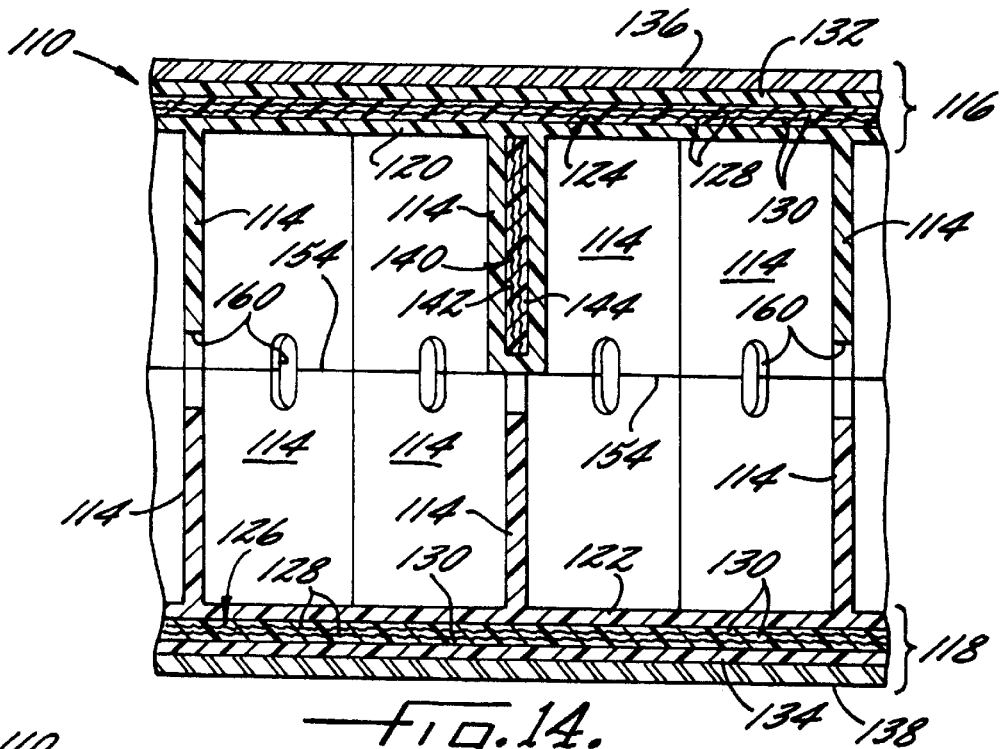
FIG. 14 is a partial cross-sectional view showing internal details of a preferred cellular, load-bearing structure in accordance with the present invention.
Figure 15:
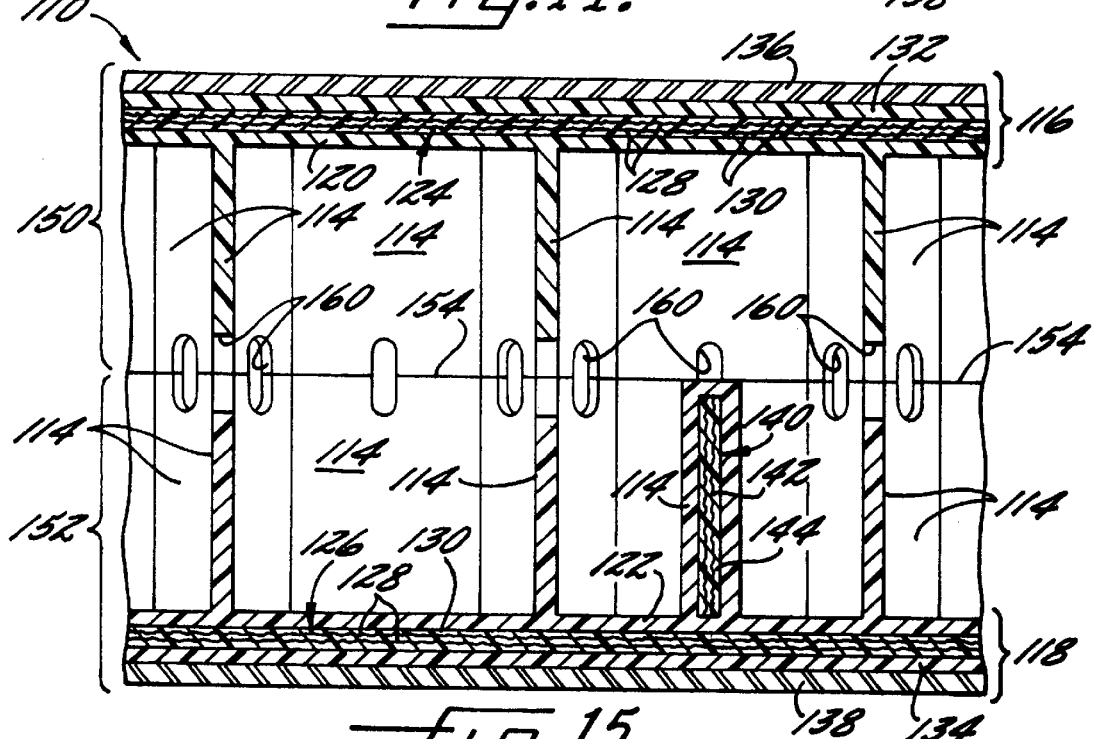
FIG. 15 is a partial cross-sectional view taken substantially perpendicular to the view of FIG. 14.

In accordance with the present invention, a molded, load-bearing structure having cellular structure and good load-bearing properties, is provided. Referring to FIGS. 14 and 15, a preferred molded structure 110 includes a cellular structure formed by walls 114, sandwiched between multi-layer skin structures 116,118. This structure is useful in combination with overlapping edges, in which case FIGS. 14 and 15 may be regarded as partial cross-sectional views taken from FIG. 1 showing additional details. Without overlapping edges, this structure is useful for furniture framing, power poles, containers, crates, shipping pallets and so forth. The cellular structure is, as shown, preferably a honeycomb structure.

Inner layers 120,122 of skins 116,118 are advantageously integral with cell-forming walls 114. To this end, walls 114 and inner layers 120,122 are beneficially made from the same thermoplastic material.

Adjacent to inner layers 120,122 are reinforcing fiber layers 124,126 comprised of reinforcing fiber 128 coated with a suitable matrix resin 130. The fiber is beneficially a fibrous structure such as a woven web disposed or encapsulated within the matrix resin. Alternative useful fibrous web structures are likewise advantageously open so as to permit matrix resin flow through the web, and include nonwoven and needle-punched webs. Exemplary useful fiberglass woven fabric is commercially available from Dynatron/Bondo and has a thickness of 0.010 inches.

Beneficially disposed exterior to and adjacent the reinforcing fiber layers are thermoplastic layers 132,134. In accordance with the invention, to enhance load-bearing properties, reinforcing fiber layer 124 is bonded to inner layer 120 and exterior layer 132, and likewise reinforcing fiber layer 126 is bonded to inner layer 122 and exterior layer 134. It is especially advantageous for a fiber layer to be coextensive with the respective inner and outer layer because among other things, greater surface area for uniting the layers is thereby provided. Layer-to-layer bonding is provided for by reinforcing fiber being thoroughly coated with, and encapsulated or disposed within, the matrix resin. Inadequate bonding would result in fibrous layer detachment and structural failure under load.

To provide for bonding between a reinforcing fiber layer and an adjacent thermoplastic layer, the matrix resin of a fiber layer is selected to be compatible with thermoplastic polymers of adjacent layers. To this end, the thermoplastic matrix resin may be the same as or different than thermoplastic polymers of adjacent layers, but in any event the materials are beneficially compatible so as to thermally bond to or fuse with or to one another, under heat and pressure. It is well known that certain thermoplastics are incompatible with one another so that delamination of or separation between adjacent layers occurs; therefore, disposing incompatible thermoplastics in contacting layers will be advantageously avoided when assembling a structure in accordance with the present invention. Within this context, a variety of thermoplastic polymers may be used as the matrix resin and adjacent layer polymers.

Exemplary suitable thermoplastic polymers include polyolefins such as polyethylene and polypropylene, polyesters such as polyethylene terephthalate, polymers of chlorinated ethylene monomers such as vinyl chloride, polyphenylene sulfide, and liquid crystalline polymers, in particular melt-processable liquid crystalline polymers. However, in load-bearing applications where some flexibility is desired and fracturing and sharp edges are not acceptable, polyolefins such as polyethylene and polypropylene advantageously are beneficially used as the matrix resin, whereas polyesters and polyphenylene sulfide would be avoided. Otherwise, engineering type plastic resins are preferred as the matrix resin, for rigidity and stiffness.

For traction in the case of, for instance a road surface, beneficially disposed exterior to thermoplastic layers 132, 134 are traction-enhancing layers 136,138 made of, for example rubber. Layers 136,138 are beneficially bonded to underlying layers 132,134. Provision of layers 136,138 as both exterior surfaces of structure 100 makes either exterior surface usable as a gripping road surface. If desired, one or both of layers 136,138 may be omitted without effect upon load-bearing properties, compared to these properties when a material such as rubber is used for traction. Similarly, an exterior layer or layers may be provided for another purpose.

Referring again to reinforcing fiber layers 124, 126, each layer is advantageously a composite structure containing reinforcing fiber in the form of a pair of fibrous web structures 128. In accordance with the invention, these layers may be beneficially made using a high melt index, high density polymer as the matrix resin. Thus, a useful polyethylene matrix resin will have a melt index of from about 15 to 30 gm/10 min, and a density in the range of about 0.95 to 0.965 gm/cc, preferably a melt index of about 20 to 25 gm/10 min, and a density of about 0.95 to 0.96 gm/cc.

When using a high melt index, high density polymer and a pair of fibrous web structures to make a reinforcing fiber layer, it is advantageous to build a multilayer structure of polymer film, fibrous web structure, polymer film, fibrous web structure, and polymer film, and thereafter to consolidate by applying suitable heat and pressure to the multilayer structure. Under heat and pressure, a high melt index, high density polymer advantageously flows through a fibrous web structure and locks with like polymer on the other side to provide a unitary structure that resists delamination. Polymer film between fibrous web structures prevents blocking; otherwise, these web structures may be pulled apart from one another after consolidation. An example of a suitable high melt index, high density matrix resin has a melt index of about 23 gm/10 min, and a density of about 0.953 gm/cc, and is commercially available as Exxon 6705.

A low melt index polymer such as a linear low density polyethylene (LLDPE), may be used as a matrix resin, under conditions of high pressure provided by for instance, a hydraulic press. However, if an inadequate consolidating pressure is used to force flow of a low melt index polymer, reinforcing fiber layers 124,126 may delaminate or separate.

A useful LLDPE polymer will be a copolymer of ethylene and minor amounts of alkenes having beneficially from about 3 to 8 carbons per alkene molecule. A particularly useful alkene is hexene, in particular 1-hexene. The LLDPE polymer will typically have a density in the range of about 0.920 to 0.930 gm/cc, and a melt index in the range of about 1 to 4 gm/10 min, preferably about 1.5 to 2.5 gm/10 min. An exemplary suitable LLDPE polymer is an ethylene-hexene copolymer having a density of 0.918 gm/cc and a melt index of 2 gm/10 min, and available as Novacor 0218.

Although a reinforcing fiber layer may consist of a single fibrous web structure and matrix resin, a pair of spaced apart, fibrous web structures in a reinforcing fiber layer, beneficially provide increased structural strength. If desired, a reinforcing fiber layer may include additional spaced apart, fibrous web structures.

Alternatives to reinforcing fiber layers based upon fibrous web structures, include reinforcing fiber layers formed by spaced apart, reinforcing fiber/matrix resin bars or re-bars. To make these reinforcing composite structures, filaments of fiber may be coated with molten matrix resin using filament coating technology. Especially useful filament coating technology is described in U.S. Pat. No. 5,607,531, which issued on Mar. 4, 1997, the pertinent disclosure of which is hereby incorporated, herein by reference. Filaments may also be coated with powder and squeezed with heated rolls similar to roving. In any case, filaments are beneficially coated with a matrix resin and the individually coated filaments disposed or encapsulated within the matrix resin. These composite structures are likewise advantageously disposed within, rather than exterior to, the skin structure.

A typical thickness for useful re-bar will be on the order of about 0.080 to 0.200", although the thickness may vary. These bars may be in a variety of shapes and may be oriented in a variety of patterns. However, flat or round bars are most common, and a lattice is a useful pattern.

In accordance with the invention, and with continued reference to FIGS. 14 and 15, composite structure 110 may be further stiffened by reinforcing members 140 beneficially vertically disposed within cell-forming, vertical walls 114. By comparison, the cellular structure may be weakened if cellular wall structure is disrupted by locating fibrous reinforcing members outside walls 114.

Similar to a reinforcing fiber layer, fibrous reinforcing members 140 are advantageously comprised of reinforcing fiber 142 disposed or encapsulated within a suitable matrix resin 144 so as to provide for thermal bonding or fusion to adjacent thermoplastic structure. A useful thickness of these members is about one-half the total wall thickness, for instance, ³⁄₃₂" for a total wall thickness of about ³⁄₁₆". As may be understood, relatively flat re-bar of greater width than thickness may be formed by pultrusion using a shaping die of appropriate aperture shape and size, and vertically disposed as shown. As in the case of re-bar in the skin structures, the number of members 140 to be used, the spacing between members, and the orientation pattern of members will depend upon the load-bearing properties desired.

Figure 17:
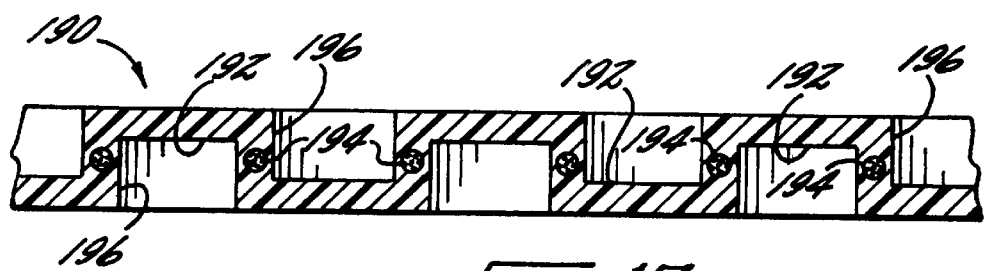
FIG. 17 is a partial cross-sectional view of another embodiment of a cellular, load-bearing structure in accordance with the present invention.

Referring to FIG. 17, a related useful cellular, load-bearing structure 190 similar to that of U.S. Pat. No. 5,405,567, is shown. As described therein, the shaped hollows 192 of structure 190 may be a variety of shapes such as square, hexagon, octagon and so forth. A distinguishing feature is the strengthening presence of reinforcing fiber/matrix resin re-bars 194 in cell-forming, vertical walls 196. Beneficially, re-bars 194 are thermally bonded to adjacent wall structure.

With reference to Table 1, structure 190 including re-bars in the cell-forming walls (indicated as Single Ply with re-bars), is compared relative to deflection and break, with different woods. The diameter of the rebar is ½" and the thickness of the structure is 1". Also compared in Table 1 is a multilayer load-bearing structure (indicated as Three Ply with re-bars) made by welding together a stack of three structures each corresponding to structure 190, with the center structure being oriented so that the rebar thereof is perpendicular to the direction of the rebar of the top and bottom structures. The deflection is the force in PSI required to produce a one inch deflection across a span of 11 ½". Also shown in the Table is whether or not the material broke under the load.

TABLE 1

| MATERIAL | DEFLECTION PSI/INCH | BREAK | WEIGHT 1 × 12 × 12" |
|---|---|---|---|
| Rough Oak | 12,500 | No | 13.3# |
| Rough Ash | 10,500 | Yes | 11.6 |
| Rough Gum | 11,000 | Yes | 8.8 |
| Dried Oak | 18,800 | Yes | — |
| Dried Ash | 13,400 | Yes | — |
| Green Oak | 11,900 | Yes | — |
| Green Ash | 11,200 | Yes | — |
| Green Gum | 9,600 | Yes | — |
| Single Ply With re-bars | 5,100 | No | 4.4 |
| Three Ply With re-bars | 14,200 | No | 4.5 |

Referring again to FIG. 15, load-bearing structure 110 consists of two partial or half structures 150,152 combined at a joining line 154, conveniently by fusion welding. The welding typically leaves a visible bead. Referring again to reinforcing fibrous members 140, these members may be disposed at an angle to one another so as to form, in separate layers as defined by partial structures 150,152, a lattice of members intersecting at approximately right angles. Other patterns may be used; for instance, the members could have a parallel orientation. Also, if desired, members 140 could be omitted from one or both of structures 150,152.

With reference to Table 2, comparative deflection data for load-bearing structures similar to FIGS. 14 and 15 but lacking reinforcing members 140 disposed as shown, are given. Each structure is 12"×12"×3 ¾", including about one-half inch, top skin and bottom skin sandwiching honeycomb cellular structure, and a rubber surface made from chopped tires. "HC" is the height of the honeycomb cells, which are formed of polyethylene. The composite used is fiberglass/polyethylene re-bar, or is woven fiberglass fabric (0.010" thickness)/polyethylene composite. The composite is thermally bonded to adjacent upper and lower polyethylene skin layers. The structures are made by welding together two half structures similar to structures 150,152. The deflection is the force in PSI required to produce a one-half inch deflection across a ten inch span.

In sample 1, 4 pieces of 2" wide, flat re-bar of 0.187" thickness and 12" length are spaced apart to form a reinforcing fiber layer in each multilayer skin. Sample 2 is the same, except that 8 pieces of 1" wide, flat re-bar are used. Sample 3 is the same as sample 2, except that in addition, 4 pieces of the 1" wide flat rebar are thermally bonded within the four side walls of the top half of the structure, and likewise 4 pieces are thermally bonded within the four side walls of the bottom half of the structure. Sample 4 shows that, compared to sample 2, pieces of thinner but wider re-bar provide a structure of about equal strength.

Samples 5 and 6, which are closest to the structure of FIGS. 14 and 15, differ from one another in the number of layers of fiberglass cloth. Sample 6 surprisingly shows that a reinforcing fiber layer consisting of a pair of vertically spaced apart, fiberglass webs imparts substantially equal structural strength compared to a reinforcing fiber layer consisting of horizontally spaced apart, 0.187", flat re-bar (sample 1).

Sample 7 is the same as sample 6, except that as in sample 4, 8 pieces of the 1" wide flat rebar are thermally bonded within the four side walls of the top and bottom halves of the structure. Sample 8 is the same as sample 6, except that the molding resin forming the honeycomb is loaded with 60 wt. % magnesium silicate, to increase the density, as later explained.

TABLE 2

| SAMPLE | HC | COMPOSITE | THICK | DEFLECTION | COMMENTS |
|---|---|---|---|---|---|
| 1 | 2" | 4-2" flat | .187" re-bar | 13,000 | In skin |
| 2 | 2 | 8-1" flat | .187 re-bar | 13,400 | In skin |
| 3 | 2 | 8-1" flat | .187 re-bar | 17,000 | In skin |
|   |   | 8-1" flat | .187 re-bar |   | On sides |
| 4 | 2 | 8-1.25" | .1 re-bar | 13,500 | In skin |
| 5 | 2 | 1-12 × 12" FG cloth |   | 11,000 | In Skin |
| 6 | 2 | 2-12 × 12" FG cloth |   | 13,000 | In skin |
| 7 | 2 | 2-12 × 12" FG cloth |   | 16,200 | In skin |
|   |   | 8-1" flat re-bar |   |   | On sides |
| 8 | 2 | 2-12 × 12" FG cloth |   | 13,000 | In skin |
|   |   | 60% Mg silicate |   |   | In honeycomb |

Reinforcing fiber used in the present invention, is preferably high strength, structural fiber. Exemplary high strength, structural fiber includes glass fiber such as E glass and S glass, carbon fiber, aramid fiber, polyphenylene sulfide fiber, and liquid crystalline polymer fiber. Mixtures of fiber may be used.

Illustrative reinforcing fiber/matrix resin composites useful in the present invention, include fiberglass/polyethylene for use with a polyethylene molding resin, and fiberglass/polypropylene for use with a polypropylene molding resin. Fiberglass bar or fabric in the skin may be combined with fiberglass bar in the cell-forming walls.

In accordance with the invention, vertical walls 114 of the cellular core structure may include bleeder holes 160 for connecting the cells. This feature allows the cellular structure to be filled with fluid for those applications where load-bearing structure 110 will be layed on the ground and may be at risk of floating away, if flooded. Typically, it will be suitable to use water as the fluid, provided that the structure has a specific gravity greater than one. A specific gravity greater than one may be advantageously provided by use of a molding resin having a density in the range of about 0.945 to 0.965 gm/cc, suitably about 0.950 to 0.960 gm/cc, in combination with fiber such as that in fiber/matrix resin composite.

For applications where rough treatment or abuse may occur or leakage is otherwise of concern, a suitable amount of a conventional gelling agent may be added to the fluid in an effective amount. Thus, water may be gelled by, for instance, adding a suitable amount of crosslinked polyacrylamide mixed with the water.

In areas where freezing may be a problem and water is used as the fluid, an antifreeze agent such as ethylene glycol, alcohol or sodium chloride may be added to the water in an effective amount. Alcohol/water mixtures may be preferred for environmental reasons and have been found to work well with polyacrylamide gelling agent with levels of alcohol up to 35 to 50%.

A specific gravity greater than one may be provided by a suitable loading of a density-increasing, additive material in addition to fiber. To this end, a mineral filler may be added to the molding resin. Exemplary mineral fillers include talc and calcium carbonate. As indicated in Table 2, suitable loadings of mineral filler may range up about 60 wt. % or more to obtain the desired specific gravity, without deleterious effect upon structural strength. Even though mineral filler may provide a stiffening benefit, loss of beneficial properties may occur. As a result, use of a high density resin as previously described, is preferred.

Figure 16:
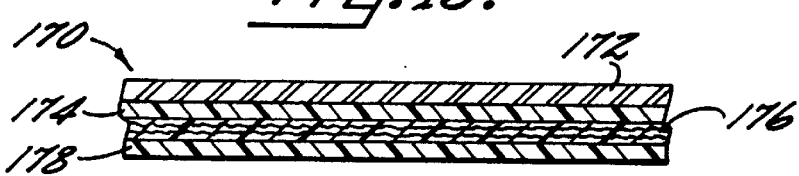
FIG. 16 is a partial cross-sectional view of a stepped-down lip in accordance with the present invention.

Referring to FIG. 16, a stepped-down lip 170 is layered similar to skin layer 116. Accordingly, lip 170 includes a gripping layer 172, and a layer 176 of reinforcing fiber/matrix resin composite disposed between and thermally bonded to thermoplastic polymer layers 174,178, forming a unitary multilayer structure. The gripping layer may be omitted if desired. Depending upon the load-bearing requirements, layer 176 may be constituted differently from the reinforcing fiber/matrix resin composite in the skin layer. As indicated in the Figure, layer 176 may be flat composite re-bar similar to fibrous reinforcing member 140.

In accordance with the present invention, a method of molding is provided as now illustrated with reference to loading-bearing structure 110. First, a layer of chopped rubber from, for instance, chopped recycled tires, is placed in a lower mold member to a suitable depth. The molding member has an ordinary smooth interior surface. As mentioned, layer 138 of granular rubber may be omitted from structure 110 depending upon the intended use of the resultant load-bearing structure; thus, this first step is optional.

Thereafter, a layer of a suitable thermoplastic material is added to make layer 134. Then, a reinforcing fiber layer comprising fiber pretreated so as to coated with a matrix resin, is added. Beneficially, as shown, the fiber layer may include a pair of spaced apart, fibrous web structures encapsulated within matrix resin. As mentioned, this fiber layer may be made by placing into the mold in sequence, the five layers earlier mentioned. Then, a layer of a suitable thermoplastic material is added.

The thermoplastic materials are conveniently added in solid form as pellets, powder, granules and so forth, to the molding member to provide layers of an appropriate depth determined by the desired thickness of the corresponding resultant layer. In the case of the second thermoplastic material, the depth needs to be adequate to make inner layer 122 and also cell-forming walls 114.

As previously described, the thermoplastic materials are advantageously compatible with the matrix resin so that layers 122,126,134 thermally bond together into a unitary structure under the molding conditions. The thermoplastic materials may be the same or different. Beneficially, the matrix resin has a higher melt index than the molding resin, and this enables the matrix resin to flow better; however, the matrix resin and molding resin may be the same type of thermoplastic, for instance, polyethylene or polypropylene.

In an upper mold member configured to form walls 114 of the cellular structure, a plurality of fibrous reinforcing members 140 are vertically disposed within wall-forming portions of the mold member. Then, the upper and lower mold members are combined and subjected to conventional heat and pressure. To this end, the molds are heated to and maintained at a temperature above the melt temperature of the highest melting resin. This temperature will vary particularly depending upon the resins used. Ordinary molding pressures are used, with the molding pressure used depending upon factors including, as earlier mentioned, the matrix resin selected.

After cooling, molded structure 152 is separated from the lower and upper mold members. The structure includes an inner layer 122 integral with cell-forming walls 114 generally perpendicular thereto, and advantageously includes a plurality of fibrous reinforcing members 140 vertically molded into and thermally bonded to cell-forming walls 114. Beneficially, the cell-forming walls are provided with a vertical taper of about 2 degrees to assist demolding. This process is repeated to form molded structure 154, and molded structure 152 and 154 are welded together to make load-bearing structure 110.

Use of a cellular structure and reinforcing fiber/matrix resin composites results in stiffness with less part weight, shorter cooling cycle during production and less problem with stress cracking, than if the structure were a solid structure, that is, without cellular structure.

In the preceding description of the present invention, there are shown and essentially described only preferred embodiments of this invention, but as mentioned, it is to be understood that the invention is capable of changes or modifications within the scope of the inventive concept expressed herein. Several changes or modifications have been briefly mentioned for purposes of illustration.

We claim:

1. A load-bearing structure comprising
   a molded structure comprising a first skin structure covering a face of a first plurality of generally vertical walls forming a first plurality of shaped hollows which have an opposing face, and
   a molded structure comprising a second skin structure covering a face of a second plurality of generally vertical walls forming a second plurality of shaped hollows which likewise have an opposing face,
   joined together with the opposing faces in contact at a joining line formed by said first plurality of generally vertical walls and by said second plurality of generally vertical walls, said opposing faces being otherwise uncovered, to form a cellular core derived from said first plurality of shaped hollows and from said second plurality of shaped hollows, and sandwiched between and covered by said first and second skin structures,
   wherein the walls forming said cellular core include a plurality of cell-connecting apertures adjoining said joining line.

2. The load-bearing structure of claim 1, further including a gel formed from a fluid and an effective amount of a suitable fluid gelling agent.

3. The load-bearing structure of claim 1, further comprising density-increasing, additive material in an amount sufficient to provide said structure with a specific gravity greater than one.

4. The load-bearing structure of claim 1, wherein said first skin structure is layered and comprises an innermost layer comprising a thermoplastic resin, and said generally vertical walls covered by said first skin structure, likewise comprise said thermoplastic resin.

5. The load-bearing structure of claim 1, wherein said first skin structure comprises a reinforcing composite fusion bonded to an adjacent compatible thermoplastic layer comprising a polyolefin selected from the group consisting of polyethylene and polypropylene, wherein said cellular core comprises honeycomb-shaped cells, and wherein said second skin structure comprises reinforcing fibers in the form of spaced apart fibrous webs.

6. The load-bearing structure of claim 1, further comprising a reinforcing composite molded within said generally vertical walls covered by said first skin structure, and a compatible thermoplastic resin disposed adjacent to said reinforcing composite, wherein said reinforcing composite is fusion bonded to said compatible thermoplastic resin.

7. The load-bearing structure of claim 1, wherein said first skin structure comprises a traction-enhancing surface layer and an underlying thermoplastic layer.

8. The load-bearing structure of claim 1, wherein said first skin structure comprises a rubber surface layer and an underlying thermoplastic layer.

9. A load-bearing structure comprising a lower stratum and an upper stratum each of which extends beyond the other to provide an upper offset and a lower offset, and being formed of a first molded structural member joined to an underlying second molded structural member, wherein said lower offset comprises a portion of said second molded structural member and a first portion of said first molded structural member that covers said portion of said second molded structural member, and said upper offset comprises a second portion of said first molded structural member and an additional portion of said second molded structural member that underlies said second portion.

10. The load-bearing structure of claim 9, wherein said portion of said second molded structural member comprises shaped hollows having an open face covered by said first portion of said first molded structural member.

11. The load-bearing structure of claim 10, wherein said shaped hollows are honeycomb-shaped and comprise generally vertical walls comprising a thermoplastic resin.

12. The load-bearing structure of claim 9, further comprising a core of cells having generally vertical walls disposed within said load bearing structure.

13. The load-bearing structure of claim 9, further comprising reinforcing composite and a compatible thermoplastic resin disposed adjacent to said reinforcing composite, wherein said reinforcing composite is fusion bonded to said compatible thermoplastic resin.

14. The load-bearing structure of claim 9, further comprising reinforcing fiber in the form of spaced apart, fibrous webs.

15. The load-bearing structure of claim 9, wherein said first molded structural member and said second molded structural member are visually identical parts.

16. The load-bearing structure of claim 9, wherein said first molded structural member is a mirror image of said second molded structural member.

17. The load-bearing structure of claim 9, wherein said first portion defines a first plane and said second portion defines a second plane, and wherein said portion of said second molded structural member and said additional portion of said second molded structural member likewise define different planes.

* * * * *